Oct. 1, 1940.  H. O. LINDGREN  2,216,442
CENTRIFUGAL SEPARATOR
Original Filed April 1, 1937

WITNESS:

INVENTOR
Hans Olof Lindgren
BY
Busser and Harding
ATTORNEYS

Patented Oct. 1, 1940

2,216,442

UNITED STATES PATENT OFFICE 2,216,442

CENTRIFUGAL SEPARATOR

Hans Olof Lindgren, Appelviken, Sweden, assignor to The De Laval Separator Company, New York, N. Y., a corporation of New Jersey Original application April 1, 1937, Serial No. 134,196. Divided and this application August 6, 1938, Serial No. 223,427. In Sweden April 4, 1936

9 Claims. (Cl. 233—22)

My invention relates to centrifugal separators of the type in which the two separated components of the liquid are discharged from the centrifugal bowl by means of stationary discharge devices, preferably disc-shaped paring devices, concentric with the bowl's axis and projecting respectively into discharge chambers communicating respectively with the inner and outer separating zones of the bowl. It is customary to position the discharge chamber for the lighter ingredient (e. g., cream, if the separator is utilized as a cream separator) below the discharge chamber for the heavier ingredient (e. g., skim milk). The cream collects in the inner part of the separating chamber, whereas the skim milk moves to the outer part of the bowl, whence it is conducted through channels along the bowl wall to the discharge member, these channels thus not crossing the cream layer or channels for the cream. In some cases, for instance, if the whole milk is supplied to the bowl through a fixed pipe line tightly connected thereto, it may be convenient to position the discharge member for the cream above the discharge member for the skim milk. The chambers containing these discharge members must be separated one from the other by a wall which projects towards the rotation axis of the bowl so far that the liquid levels in the chambers cannot in any circumstances reach the inner edge of the wall and overflow the same. In some cases, as, for example, when the chambers are arranged as last described and when the whole milk is supplied through a tightly connected pipe, it is impossible to extend the separating wall sufficiently far inward, as space must be allowed for a conduit to the paring discharge member that is positioned below the wall, and, also, there must be a provision for play between the inner edge of the wall and the conduit. However, by locating the cream chamber above the skim milk chamber it is possible to insure against cream entering the skim milk chamber, which it is much more important to prevent than leakage of skim milk into the cream chamber. This is insured by providing that wall of the cream chamber which is located above the discharge member with a hole of greater diameter than that of the hole in the lower wall. When the levels are displaced inwardly, the cream will flow over the edge of the hole in the upper wall, before the level reaches the edge of the lower wall. The cream thus leaves the bowl instead of entering the skim milk chamber.

When the skim milk discharge chamber is located below the cream discharge chamber, it must both at the upper and the lower part be bounded by walls which are reliably sealed against the cream above and below, in order to avoid re-mixing. As it must be possible to remove the discharge member from the chamber for cleaning, the said chamber must be susceptible of being taken apart. A tight joint at the seam is established by means of some suitable member, for instance, a rubber ring. The efficient operation of the centrifuge then depends on the capacity of the rubber ring to make a reliably tight joint. As already mentioned, it is much more important to prevent cream from getting into the skim milk than the reverse. In order to insure against this in all circumstances, the centrifugal bowl is so arranged that there is always an over-pressure in the skim milk mass in relation to the cream mass. If a leakage occurs, it must therefore be from the skim milk side to the cream side. A leakage of this kind is permissible, if it is not too great. A high pressure in the skim milk parer chamber requires, in order to have a proper ratio between the quantities of skim milk and cream discharged from the bowl, a high pressure in the cream space of the separating chamber of the bowl. In order to maintain this high pressure in the cream space and at the same time permit a low pressure in the cream parer chamber, a level outlet is provided between the separating chamber and the parer chamber for the cream. Alternatively, throttling means may be arranged in the channel between the separating chamber and the cream chamber, so that a drop of pressure takes place therein.

Figure 1:
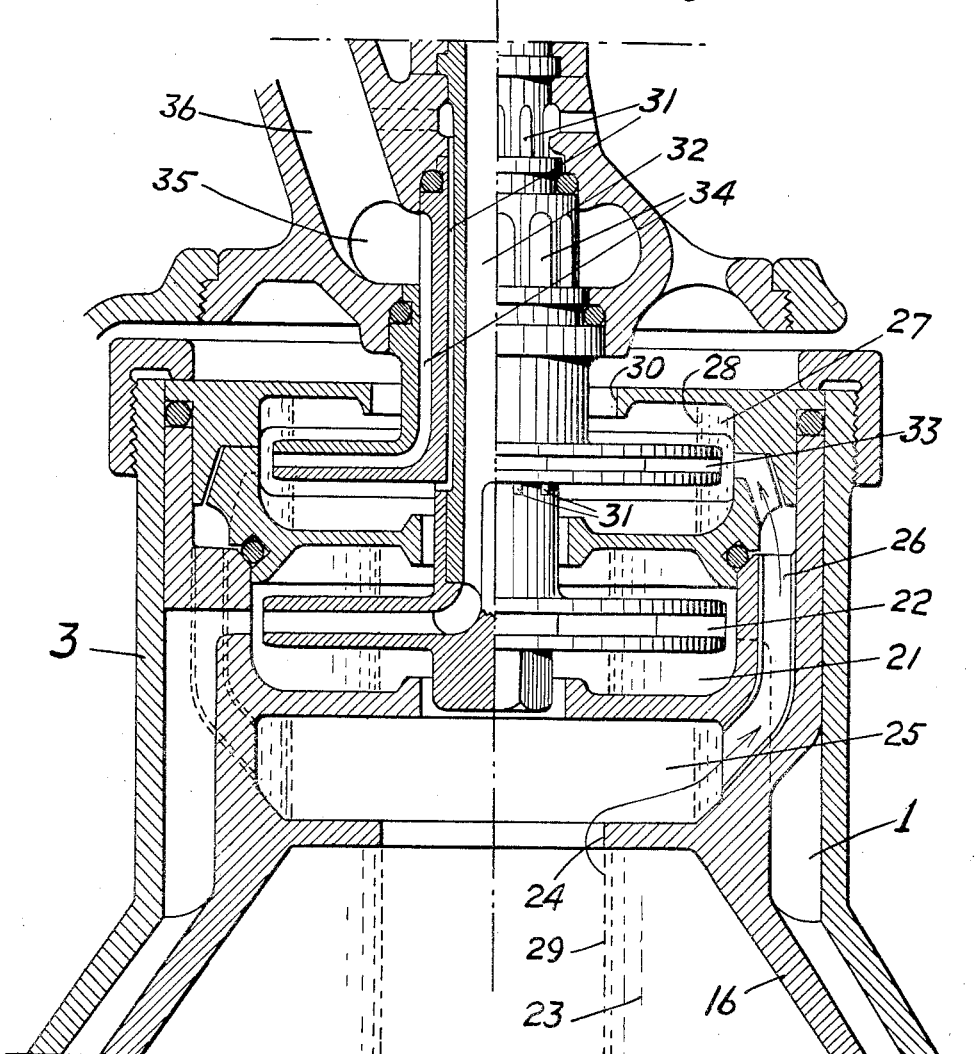
Fig. 1 is a side elevation, largely in section, through a centrifugal separator embodying the features just described.

Referring first to the construction shown in Fig. 1: The skim milk flows through a channel 1 from the outer part of the centrifugal bowl to a chamber 21 containing a stationary paring member 22. The cream flows from the inner part 23 of the separating chamber over an edge 24 into a chamber 25, which, through a channel 26, communicates with a paring discharge chamber 27 for the cream. The level 28 of the cream will thereby in both chambers 25 and 27 be more or less far outside the cream level 29 in the separating chamber. A certain minimum of difference between the pressures in the separating chamber and the parer chamber is insured by spacing the edge 30 of the hole in the upper wall of the cream chamber measurably further from the bowl's axis than the edge 24. The construction described insures a lower pressure on the cream side than on the skim milk side, so that if leakage occurs, the entrance of the cream into the skim milk is reliably prevented.

The satisfactory operation of the safety device is conditional upon the air pressure in the discharge chambers being equal to or nearly equal to the atmospheric pressure. This is insured by a number of air channels 31 through which the said chambers communicate with the atmosphere. The channels are in the shape of grooves milled in one of the mutually concentric discharge members for cream and skim milk. They communicate with the lower part of the cream parer chamber 27 and this, in turn, is in free communication, through the space around the stationary tube, with the upper part of the skim milk parer chamber 21.

The skim milk is conducted from the paring member 22 through the central channel 32 out of the centrifuge. The cream is conducted from the chamber 27 by a paring member 33, which is provided with a number of channels in the form of grooves 34, to an annular chamber 35 having a discharge channel 36. The channels 32 and 36 are tightly connected to fixed pipe lines which are provided with valves. By throttling these valves the percentage of cream can be regulated.

Figure 2:
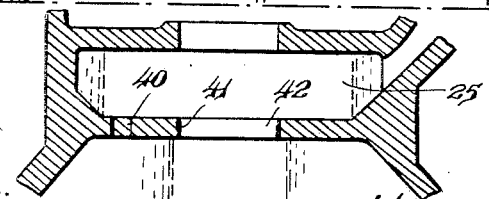
Fig. 2 is a similar (partial) view of a modification.

I have hereinbefore stated that instead of a level outlet, such as the weir formed by the edge 24, over which the light constituent flows into the chamber 25, throttling means may be arranged in the channel between the separating chamber and the cream chamber so that a drop of pressure takes place therein. One form of throttling means is to provide, in the wall separating the part 23 of the bowl chamber from the chamber 25, one or more orifices 40. The diameter of the central hole 42 is so small (preferably less than that of the corresponding central hole in Fig. 1), and the distance from such hole of the orifice 40 is such that the inner wall of cream will never be so far inwardly displaced as to flow over the edge 41, but will all flow through the orifice or orifices 40, whose area is so small as to effect the desired throttling and drop of pressure. Both the weir 24 of Fig. 1 and the orifice 40 of Fig. 2 have in common the provision of a wall, between the inner zone of the bowl and the upper discharge chamber, having therethrough an opening whose diameter is substantially less than that of the parer 27 and which is adapted to cause a pressure drop between said inner zone and the upper discharge chamber that will insure a lower pressure in the upper discharge chamber for the lighter separated liquid than that in the lower chamber for the heavier separated liquid.

It is clear from the foregoing description that the level in a parer chamber will change through a wide range as a result in variations in resistance to flow of the discharged liquid. The effect is, as explained, to maintain, regardless of such changes of level in the paring chamber or chambers, a uniform level of liquid in the bowl as, a result of large changes of level in the parer chamber or chambers, small changes of level in the bowl. An extreme example is that shown in the drawing, wherein the level of the cream in the bowl depends entirely on the diameter of the edge 24 and remains nearly or quite uniform regardless of changes of level in chambers 25 and 27 as long as their circles are outside that of the weir 24.

This application is a division of an application filed by me April 1, 1937, Serial No. 134,196.

What I claim and desire to protect by Letters Patent is:

1. In a centrifugal separator comprising a rotatable bowl, discharge chambers rotating with the bowl and arranged one above the other and paring devices within the respective chambers, means to convey separated heavier liquid from the peripheral part of the bowl to the lower discharge chamber and means to convey lighter separated liquid from an inner zone of the bowl to the upper discharge chamber; said last named means comprising a light liquid receiving chamber below the heavy liquid discharge chamber, the lower wall of the light liquid receiving chamber having a hole providing an inner edge concentric with the axis of the bowl and forming a light liquid level outlet for separated lighter liquid, and a passage connecting the light liquid receiving chamber with the upper discharge chamber.

2. A centrifugal separator comprising a rotatable bowl, annular discharge chambers rotating with the bowl and arranged one above the other, stationary paring devices within the respective chambers, a stationary axially extending element carrying the paring devices and provided with discharge passages communicating with the respective paring devices, the upper wall of the upper discharge chamber and the wall separating the two discharge chambers having central holes forming inner edges spaced from said axially extending element, means to convey separated heavier liquid from the peripheral zone of the bowl to the lower discharge chamber, and means to convey lighter separated liquid from the inner zone of the bowl to the upper discharge chamber; the latter means comprising a light liquid receiving chamber below the heavy liquid discharge chamber, the light liquid receiving chamber having a hole providing an inner edge concentric with the axis of the bowl and forming a light liquid level bowl chamber outlet for separated lighter liquid, and a passage connecting the light liquid receiving chamber with the upper discharge chamber; the diameter of the hole in the upper wall of the upper chamber being measurably greater than the diameter of the hole in the light liquid receiving chamber.

3. A centrifugal separator comprising a rotatable bowl, annular discharge chambers rotating with the bowl and arranged one above the other, stationary paring devices within the respective chambers, a stationary axially extending element carrying the paring devices and provided with discharge passages communicating with the respective paring devices, means to convey separated heavier liquid from the peripheral zone of the bowl to the lower discharge chamber, and means to convey lighter separated liquid from an inner zone of the bowl to the upper discharge chamber; the upper wall of the upper lighter liquid discharge chamber and the wall separating the two discharge chambers having central holes providing inner edges spaced from said axially extending element, the diameter of the hole in said upper wall being substantially greater than the diameter of the hole in the other wall to thereby insure against escape of lighter liquid over the inner edge of said other wall into the heavier liquid discharge chamber.

4. In a centrifugal separator comprising a rotatable bowl, discharge chambers rotating with the bowl and arranged one above the other and both at the same end of the bowl and having between them a wall, having a central opening, common to the two chambers spacing one from the other, paring devices within the respective chambers and passages for liquid outflow therefrom, means to convey separated heavier liquid from the peripheral part of the bowl to the lower discharge chamber and means to convey lighter separated liquid from an inner zone of the bowl to the upper discharge chamber, the upper wall of the chamber for discharging the lighter liquid having a central opening of greater diameter than the central opening in the wall separating the two chambers, thereby insuring against leakage of lighter fluid from the upper discharge chamber to the lower discharge chamber.

5. In a centrifugal separator comprising a rotatable bowl, discharge chambers rotating with the bowl, arranged one above the other, paring devices within the respective chambers and passages for liquid outflow therefrom, passages to convey separated heavier liquid from the peripheral part of the bowl to the lower discharge chamber and other passages to convey lighter separated liquid from the inner zone of the bowl to the upper discharge chamber and means, including a weir over which the lighter separated constituent must flow in its movement from the inner zone of the bowl toward said other passages, and located so close to the bowl's axis as to insure that the pressure in the passages from the peripheral part of the bowl shall be greater than the pressure in the passages from the inner zone of the bowl.

6. In a centrifugal separator comprising a rotatable bowl, discharge chambers rotating with the bowl and arranged one above the other and paring devices within the respective chambers, means to convey separated heavier liquid from the peripheral part of the bowl to the lower discharge chamber, a passage to convey lighter separated liquid to the upper discharge chamber, and means, including a wall between the inner zone of the bowl and said passage and having therethrough an opening whose diameter is substantially less than that of the paring device in the upper discharge chamber, to insure a pressure drop between the inner zone of the bowl and the upper discharge chamber.

7. In a centrifugal separator comprising a rotatable bowl, discharge chambers rotating with the bowl and arranged one above the other, paring devices within the respective chambers, a passage for conveyance of separated heavier liquid from the peripheral part of the bowl to the lower discharge chamber, a passage for conveyance of separated lighter liquid to the upper discharge chamber, a light liquid receiving chamber below the lower heavy liquid discharge chamber into which the lighter separated liquid is adapted to flow from the bowl and from which such lighter separated liquid is adapted to flow through the last named passage to the upper light liquid discharge chamber, the lower wall of the light liquid receiving chamber separating the light liquid receiving chamber from the separating chamber of the bowl and having an inner edge concentric with the axis of the bowl and so near thereto as to maintain a level of liquid in said separating chamber so close to said axis as to insure that the pressure in the passage leading from the peripheral part of the bowl to the lower heavy liquid discharge chamber shall be greater than the pressure in the passage from the light liquid receiving chamber to the upper light liquid discharge chamber.

8. A centrifugal separator as defined in claim 7 in which the inner edge of said wall acts as a weir over which the lighter separated liquid must flow in its movement from the inner zone to the light liquid discharge passage, thereby causing a pressure drop between the inner zone of the bowl and the upper light liquid discharge chamber as well as an increase of pressure in the passage leading from the peripheral part of the bowl to the lower heavy liquid discharge chamber.

9. A centrifugal separator as defined in claim 7 and comprising also means to throttle the flow from the inner zone of the bowl to the upper lighter liquid discharge chamber for lighter separated liquid to thereby cause a pressure drop between the inner zone of the bowl and the upper light liquid discharge chamber.

HANS OLOF LINDGREN.